May 21, 1935.                    P. VIVIANO                    2,002,459
VEHICLE SPRING SUSPENSION
Filed March 12, 1934
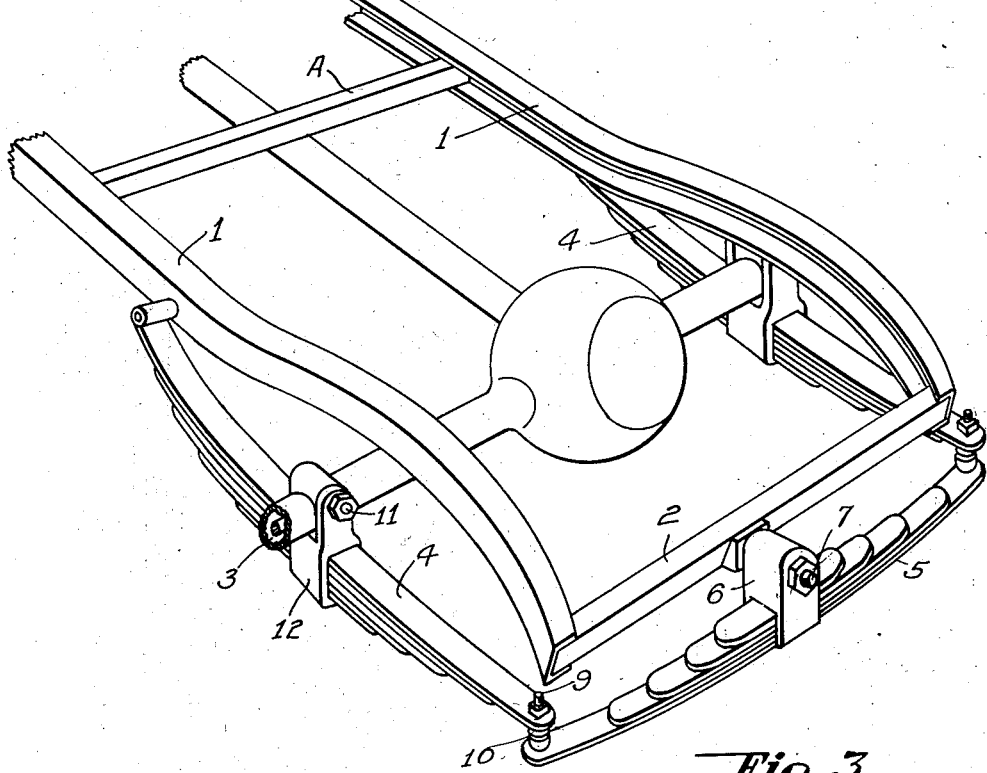
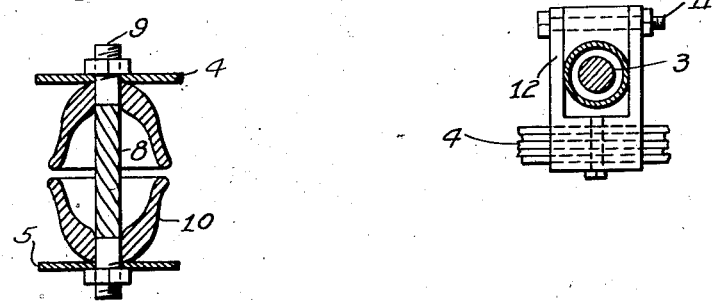
INVENTOR
PHILIP VIVIANO
By- Ben V Zillman
ATTORNEY Patented May 21, 1935

2,002,459

UNITED STATES PATENT OFFICE 2,002,459

VEHICLE SPRING SUSPENSION

Philip Viviano, St. Louis, Mo.

Application March 12, 1934, Serial No. 715,090

2 Claims. (Cl. 267—36)

The invention has among its objects the production of a spring suspension for vehicles, particularly motor vehicles, in which there shall be a maximum of cushioning of the shocks of the roadway during riding, an improved steadiness of the ride, a simplicity of spring construction, with better wearing of the parts, and in which the construction shall be otherwise reliable, satisfactory and efficient for use wherever deemed applicable.

Another object of my invention is to provide a novel spring assembly, in which there will be many points distributed throughout, to absorb the shocks, so that such shocks will be absorbed gently and uniformly at these points and not at only a few points.

A further object of my invention is to so interconnect the springs on opposite sides of the frame, that shocks on one side will be distributed to the other side as well, and thereby equalize the shocks and make for easier and steadier riding qualities of the vehicle.

Many other objects and advantages of the construction herein shown and described will be obvious to those skilled in the art to which this invention appertains, as will be apparent from the disclosures herein given.

To this end, my invention consists in the novel construction, arrangement, and combination of parts herein shown and described, and the uses mentioned, as will be more particularly pointed out in the claims.

In the drawing, wherein like reference numerals indicate like or corresponding parts throughout the views, Figure 1 is a perspective view of the rear end of a motor vehicle frame and a spring assembly therefor;

Figure 2 is a detailed cross-sectional view of the manner of connecting the adjacent ends of the rear and side springs; and Figure 3 is a detail of the manner of securing the axle to one of the side springs.

Referring more particularly to the drawing, wherein I have illustrated one of the preferred embodiments of my invention, there is shown a chassis or frame of a motor vehicle at A, the rear portion being shown for the sake of convenience and simplicity, said frame being of the usual or other suitable construction, and having the side elements 1—1 extending longitudinally of the frame, and the end or rear piece or element 2 interconnecting said side pieces, said end piece extending transversely of the frame. In addition, there is indicated the rear axle 3, suitably driven and controlled by the operator of the vehicle.

As the front end of the vehicle may be supported in the same manner as the rear end, if desired, it is necessary that only the end shown need be described.

At either side of the frame and extending longitudinally thereof and therealong are side springs 4—4, there being one of these spring units at each side, and they may be of the built-up leaf-spring variety, if preferred. Extending transversely across one end of the frame, as across the end 2, is an elongated member 5, which may also be of a built-up leaf spring assembly. The end spring 5 is pivotally connected intermediate its ends, to the end piece 2 of the frame, as by carrying the spring in some sort of a clip 6 which is in turn rotatably mounted to a bolt 7, so that the entire rear spring 5 may be swung on said horizontal pivot 7.

The rear ends of the side springs 4 are connected to the adjacent ends of the rear spring 5, but in order to improve and simplify the said connection, I have porvided flexible connectors thereat, in the form of a short length of cable 8, which may have short sheaths or sleeves 9 at their ends, threaded through openings in the ends of the springs 4 and 5, somewhat as shown. In order that no sharp edges will bear against the cable to thereby tend to shear the same, I have provided bells or guards 10 with outwardly flared open ends or mouths, so that the bell will not cut into the cable even though the latter is pulled sidewise relatively thereof. The bells are drawn together so that the ends are spaced a short distance apart, so that it is obvious that the sprinsg may move horizontally in any direction at said points of securement, and that the bells will stop and limit movement of the spring ends together vertically.

The other end of each side spring is pivotally secured to the frame side piece, and said side springs are secured intermediate their ends to the axle 3. It is preferable that the side springs have a slight movement sidewise of the frame and axle, and in order to obtain this result, I preferably attach the side springs to the axle with a pivotal connection. One form of such pivotal connection may consist of a horizontal, longitudinally extending pivot pin 11 fastened to the axle, and a hanger or saddle 12 pivotally suspended from this pin and carrying the spring 4.

From the construction set forth, it is obvious that such a spring suspension will provide many points whereat the road shocks may be absorbed and dissipated and thereby result in easy riding. A shock at either side of the frame will cause that side to exert an upward or downward force on the rear spring, thereby transmitting a portion of the shock to the opposite side, inasmuch as the pivotal connection at the rear spring will permit of such movement.

The flexible cable connection illustrated will enable the user to dispense with the usual double shackles otherwise necessary to interconnect such members, thus making for greater economy and with a simplified construction, and further little or no greasing will be required thereat.

The spring suspension illustrated serves to permit either side of the frame to lift straight up and with less likelihood of the load overturning the vehicle, especially when going over bumps or on a turn of the road. Any shock at either end of the vehicle is absorbed at at least six points, namely, at the front, rear, and both ends of the rear spring.

Having thus described my invention, it is obvious that various immaterial modifications may be made in the same without departing from the spirit of my invention; hence I do not wish to be understood as limiting myself to the exact form, arrangement, construction and combination of parts herein shown and described, except as limited by the state of the art to which this invention appertains, and the claims hereunto appended.

What I claim as new and desire to secure by Letters Patent is:

1. The combination with a vehicle frame and an axle, of side springs extending longitudinally of said frame and secured at one end to said frame; saddles pivotally suspended from said axle and movable therewith and secured to the springs intermediate the ends of said springs so as to swing about axes substantially parallel to the longitudinal axis of said frame; and transversely extending means pivotally suspended intermediate its ends from said frame to rotate about a horizontal axis and secured adjacent its ends to the other ends of said side springs to transmit the movement of one side spring to the other.

2. The combination with a vehicle frame and an axle, of a transverse member pivotally secured to one end of said frame; side springs secured at one end to said transverse member and extending longitudinally along said frame and having the other end secured to said frame; and means connecting each side spring intermediate its end to said axle to permit the latter to rotate about a horizontal axis relatively of the former.

PHILIP VIVIANO.